Figure 1:
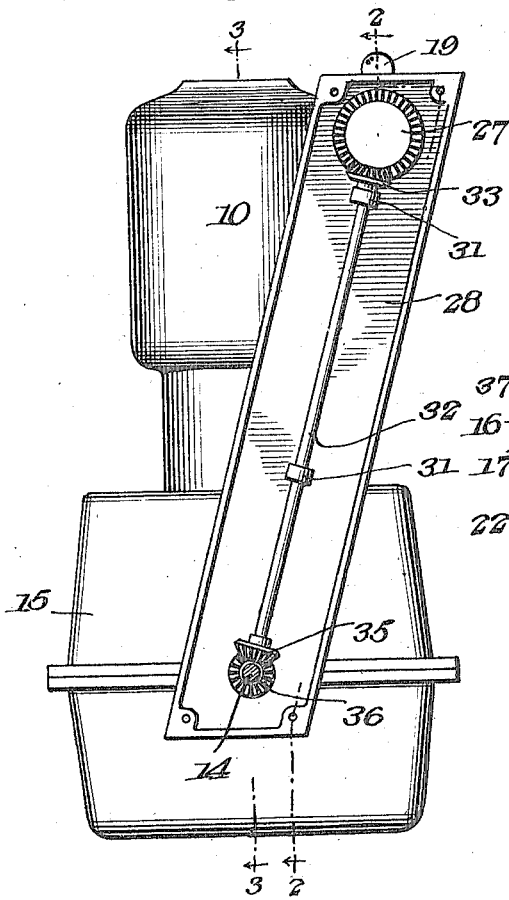

J. L. ALDERSON.
ROTARY VALVE.
APPLICATION FILED FEB. 6, 1915.

1,263,991.

Patented Apr. 23, 1918.
3 SHEETS—SHEET 1.

Witnesses
Hugh H. Ott.

Inventor
Jason L. Alderson
By Victor J. Evans
Attorney

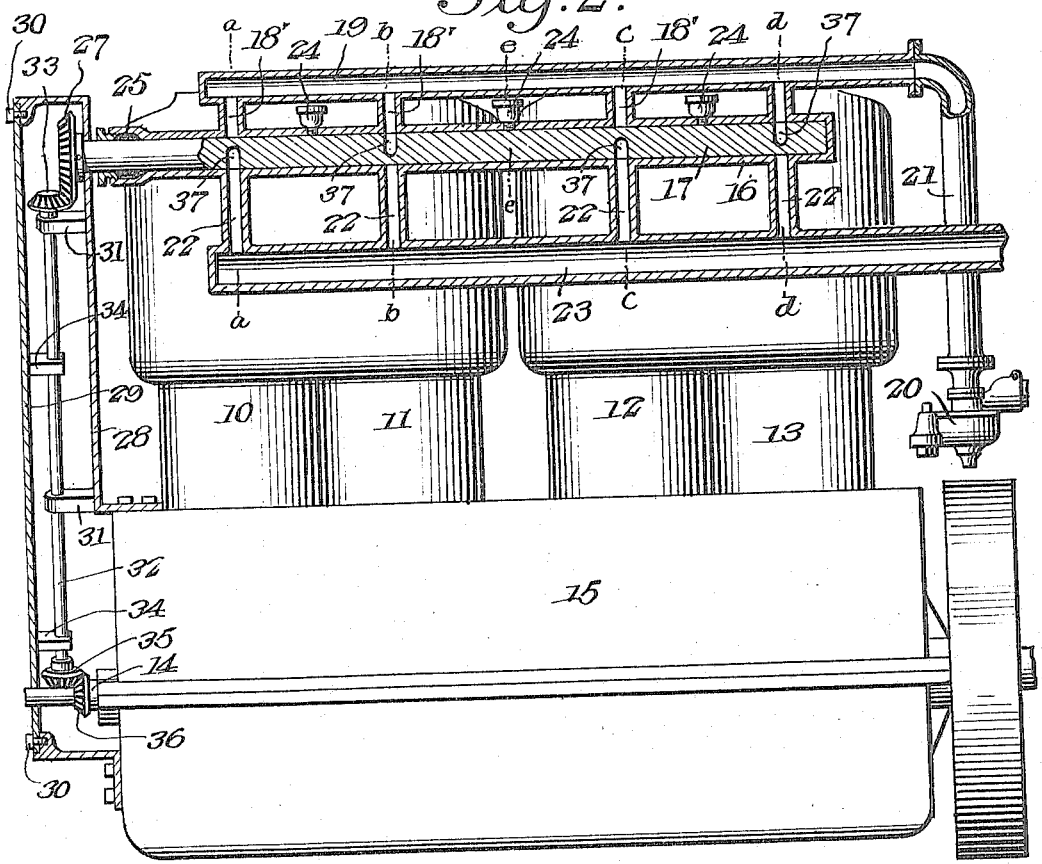
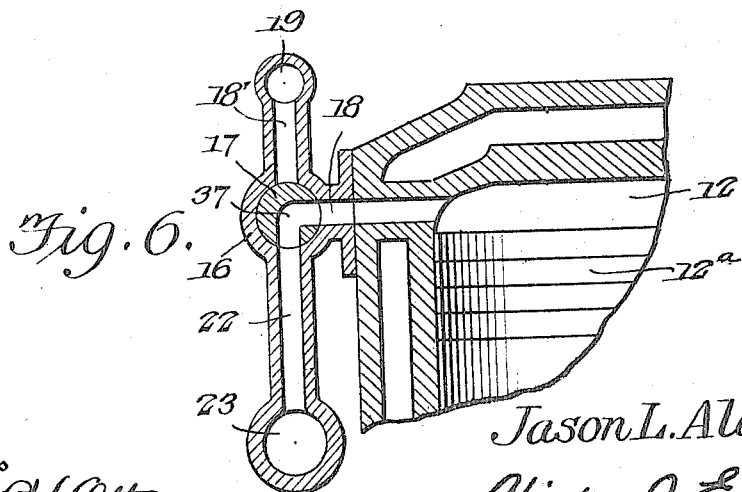

J. L. ALDERSON.
ROTARY VALVE.
APPLICATION FILED FEB. 6, 1915.
1,263,991.
Patented Apr. 23, 1918.
3 SHEETS—SHEET 3.
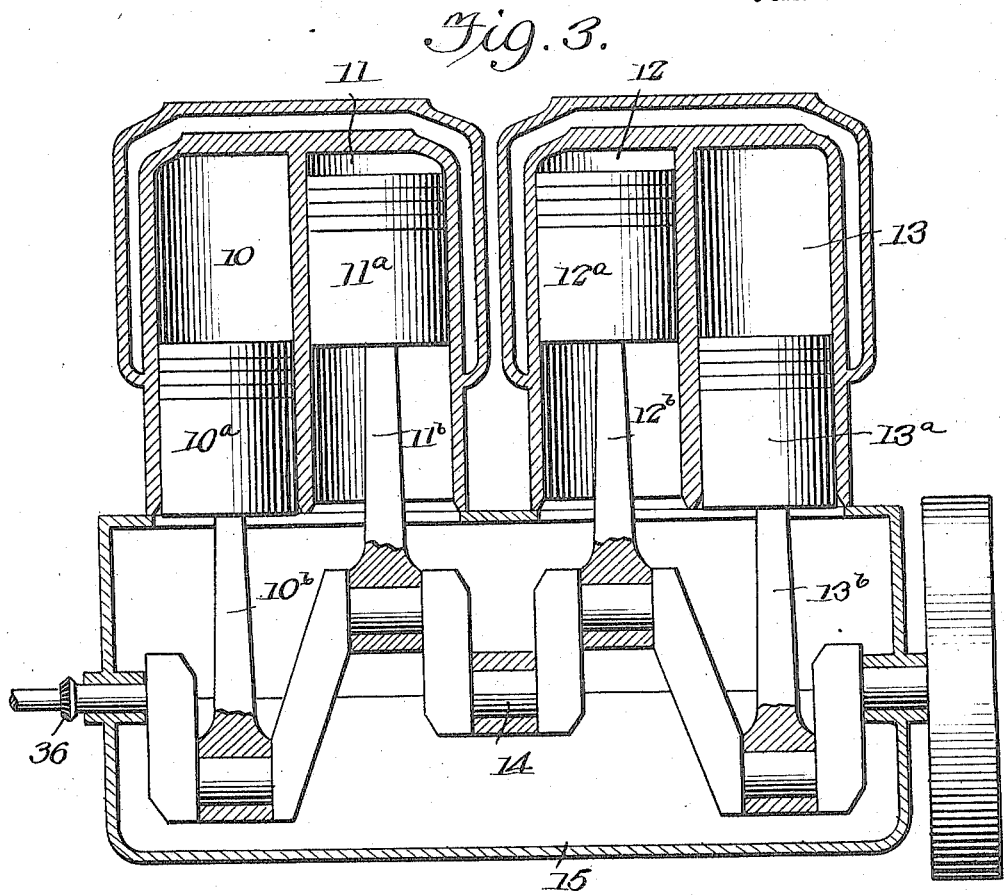
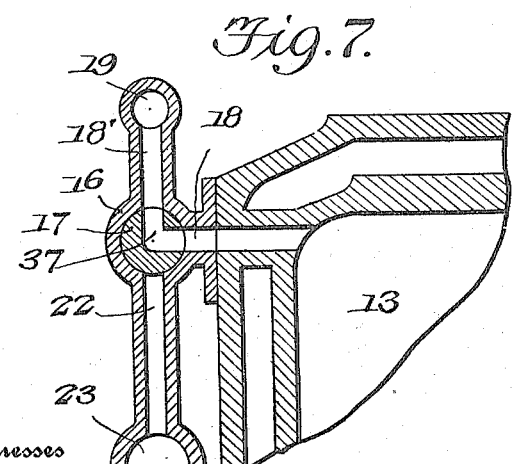
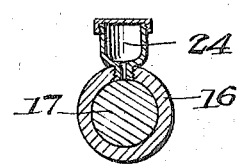
Inventor
Jason L. Alderson
By Victor J. Evans
Attorney
Witnesses
Hugh V. Ott

UNITED STATES PATENT OFFICE.

JASON L. ALDERSON, OF SOUTH BEND, INDIANA.

ROTARY VALVE.

1,263,991.  Specification of Letters Patent.  Patented Apr. 23, 1918.

Application filed February 6, 1915. Serial No. 6,645.

*To all whom it may concern:*

Be it known that I, JASON L. ALDERSON, a citizen of the United States, residing at South Bend, in the county of St. Joseph and State of Indiana, have invented new and useful Improvements in Rotary Valves, of which the following is a specification.

The present invention relates to improvements in valves for hydro-carbon engines.

In carrying out my invention I propose to provide a valve for hydro-carbon engines whereby uniformity of movement of the valves is secured and maintained, so that the intake of gas and the discharge of the hydro-carbons is accomplished when the piston heads are in proper position and whereby the maximum efficiency of the engine is maintained.

Also I aim to provide a rotary valve which is of an extremely simple construction and thoroughly efficient in operation.

With the above and other objects in view, the improvement resides in the construction, combination and arrangement of parts set forth in the following specification and falling within the scope of the appended claim.

Figure 5:
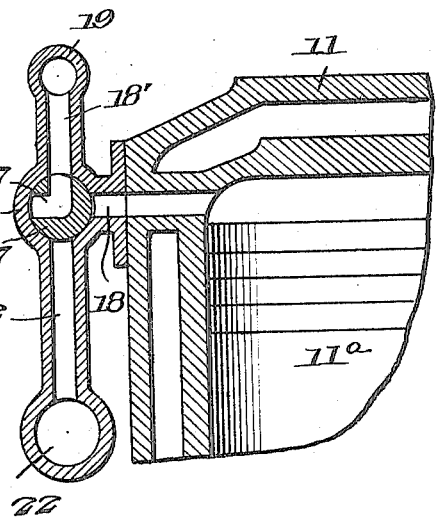
Figure 4:
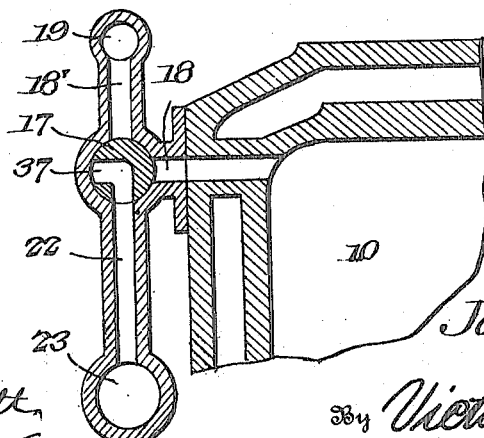

In the drawings:

Figure 1 is an elevation of an engine provided with my improvement,

Fig. 2 is a longitudinal sectional view approximately on the line 2—2 of Fig. 1, Fig. 3 is a similar sectional view on the line 3—3 of Fig. 1, Fig. 4 is a view representing a partial vertical section through the device illustrated in Fig. 2 on the line $a$—$a$ thereof, Fig. 5 is a similar sectional view on the line $b$—$b$ of Fig. 2, Fig. 6 is a similar section on the line $c$—$c$ of Fig. 2, Fig. 7 is a similar sectional view on the line $d$—$d$ of Fig. 2, and Fig. 8 is a sectional view on the line $e$—$e$ of Fig. 2.

As is well known high efficiency in hydro-carbon engines is largely governed by the action of the valves which control the inlet and outlet ports to the combustion chambers. In hand controlled valves the cams often vary the distance of the throw of the valves with the rapid increase of speed of the engine so that the valves will not be uniformly closed at the proper time. This variation in movement of the valves effects the efficiency of the engine by limiting the charge of gas taken into the combustion chamber or by preventing a complete discharge of the hydro-carbon. In either case the engine does not develop the power it is capable of developing and among the objects of my invention is to overcome the deficiency herein set forth.

In the embodiment of my invention, shown in the drawings, the improvement is applied to an explosive engine of the four-cycle type but manifestly, as will later appear, may be applied to other types of engines and to other devices in which fluids are handled, such, for instance, as devices for pumping fluids; for compressing or exhausting gases and for other such like purposes.

Referring now to the drawings in detail, in which like characters of reference indicate corresponding parts throughout the several views, 10, 11, 12 and 13 indicate the cylinders of a four-cycle engine; $10^a$, $11^a$, $12^a$, and $13^a$ the respective pistons adapted for reciprocation in the said cylinders; 14 the crank shaft and $10^b$, $11^b$, $12^b$, and $13^b$ the respective connecting rods by which the several engines are connected to the crank shaft 14.

15 designates the crank casing inclosing the crank shaft, the side members of which being provided with suitable bearings within which the ends of the crank shaft 14 are journaled. The several cylinders may be provided with the usual water jackets which may be all connected together and supplied with water in a suitable inlet (not shown). Above said cylinders is located a tubular valve casing 16 and filling the said cylinder is a rotatable valve core or plug 17, the same being provided with right angularly arranged ports which communicate with elongated ports 18 provided in the closed top of each of the piston cylinders. Also communicating with the right angular openings in the core 17 are ports 18 which are connected with a fluid inlet manifold 19, the same having one of its closed ends provided with a carbureter indicated by the numeral 20, and the manifold is, of course, provided with a suitable inlet pipe 21. It is to be understood that the manifold 19 extends longitudinally of the valve casing 16, and the said valve casing, diametrically opposite the inlet ports 18 is provided with a plurality of outlet ports 22 which have a pipe connection with an exhaust manifold 23. The valve casing 16, intermediate of the ports 18 is provided with a plurality of oil cups 24 which are adapted to supply the valve plug 17 with a lubricant so that the said plug may be freely rotated within the casing 16. The casing 17 has one of its ends closed and against this closed end one of the ends of the plug 17 abuts. The plug 17 projects through the second and open end of the casing, the same being surrounded by suitable packing glands arranged within a packing box 25 that is secured to one side of the engine casing or frame. The extending end of the plug is provided with a beveled gear 27 and is arranged within a gear casing 28. The casing 28 is provided with an open front or end, the same being normally closed by a removable door or plate 29 which is preferably connected to the casing through the medium of bolts 30, the shanks of which being received within suitable lugs in the side and end members of the said casing. The casing may comprise an open substantially rectangular frame, one of the ends of which being closed by the engine casing and the opposite end being closed by the plate, just referred to, or the said casing may be provided with an inner wall which is secured to one of the end walls of the engine casing. Such inner wall of the casing is provided with spaced bearings 31, for the reception of a vertically extending shaft 32, the upper end of said shaft being provided with a beveled gear 33 that meshes with the gear 27. The plate or closure 29 is formed with one or more inwardly projecting lugs 34, the ends of which being formed with semicylindrical vertically disposed depressions which engage with the shaft 32 to assist the bearings 31 in sustaining the said shaft against lateral movement. The lower end of the shaft 32 has secured thereon a beveled gear 35 which meshes with a similar gear 36 arranged upon one of the extending ends of the crank shaft 14. The gears in connection with the crank shaft 14 are so arranged that the crank shaft 14 will complete two revolutions while the plug 17 completes a single revolution.

The plug 17 is provided with ports 37, the number of said ports corresponding with the cylinders to be served, in this example, four. The ports 37 are of a right angular formation, and when the pistons are in the position illustrated in Fig. 3, and shown in detail in Figs. 4, 5, 6 and 7, the port 37 for the intake port 18' of the cylinder 10 may be considered at zero, the piston 10ª being at its impulse stroke. The port 37 for the port 18 communicates with the cylinder 11 and is arranged at an angle of 90° with relation to the first mentioned port, the piston 11ª in the said cylinder being at its compression stroke. The third port 37 of the plug is at an angle of 275° with relation to the first mentioned port, the piston 12ª in the cylinder 12 being at its exhaust stroke, while the port 37 for the last cylinder, 13, is at an angle of 180° with relation to the first mentioned port of the plug, the piston 13ª in the cylinder 13 is charging so it will be noted that the ports in the plug are to be each a one-quarter turn apart from the preceding or succeeding one, and, of course, all of the ports are spaced from each other by the metal of the plug dividing the same.

It is to be noted that the intake and outlet ports in the valve casing 16 are arranged diametrically opposite each other and also that the ports of the cylinders are disposed centrally of said intake and outlet ports, so it will be noted that while gas is admitted through one of the angular ports 37 through the elongated port in the top of one of the cylinders, the discharge of the hydro-carbon from another cylinder will pass through the elongated port 18 of a second cylinder and will be directed through one of the angular ports or passages 37 of the plug 17 through one of the outlets 38 to the discharge manifold 23. By reference to Figs. 4, 5, 6 and 7 it will also be noted that as the pistons in the cylinders 11 and 12 are at their highest positions the ports in the rotary valve will be more than one-half closed, and likewise the valve ports or passages for the cylinders 10 and 13, whose pistons are at their lowest stroke, are more than one-half closed and from the above description taken in connection with the accompanying drawings, the simplicity of the device, as well as the advantages thereof will it is thought be perfectly apparent to those skilled in the art to which such invention appertains without further detailed description.

Having thus described the invention, what I claim is:

In combination with an internal combustion engine having its cylinders each provided with a single combined inlet and exhaust port; a cylindrical valve casing secured upon the cylinders and extending along the upper portions thereof directly opposite said ports and provided with ports alining with said cylinder ports, an intake manifold disposed vertically above and spaced from said valve casing and extending parallel therewith, tubular members communicating with said intake manifold and with said valve casing in the same vertical planes with said ports, an exhaust manifold disposed vertically below and spaced from said valve casing and extending parallel therewith, tubular members communicating with said exhaust manifold and with said valve casing in the same vertical planes with said ports and said first named tubular members, and a solid valve revoluble within said valve casing and provided with angular ports alining with said cylinder ports and with said tubular members.

In testimony whereof I affix my signature in presence of two witnesses.

JASON L. ALDERSON.

Witnesses:
FRANK A. NOLAND,
DESSIE WEBSTER.

Copies of this patent may be obtained for five cents each, by addressing the "Commissioner of Patents, Washington, D. C."